United States Patent
Murayama et al.

(10) Patent No.: US 6,991,071 B2
(45) Date of Patent: Jan. 31, 2006

(54) WEDGE-OPERATED BRAKE APPARATUS

(75) Inventors: Takashi Murayama, Kariya (JP); Daizo Oba, Kariya (JP)

(73) Assignee: Advics Co., Ltd., Kariya (JP)

( * ) Notice: Subject to any disclaimer, the term of this patent is extended or adjusted under 35 U.S.C. 154(b) by 66 days.

(21) Appl. No.: 10/627,817

(22) Filed: Jul. 28, 2003

(65) Prior Publication Data

US 2004/0026185 A1 Feb. 12, 2004

(30) Foreign Application Priority Data

Aug. 8, 2002 (JP) .................................. 2002-231518

(51) Int. Cl.
   *F16D 65/38* (2006.01)

(52) U.S. Cl. .................................................... 188/72.7
(58) Field of Classification Search ................ 188/71.7, 188/71.9, 72.7, 196 V, 343
   See application file for complete search history.

(56) References Cited

U.S. PATENT DOCUMENTS

| | | | |
|---|---|---|---|
| 3,237,724 A | | 3/1966 | Kershner et al. |
| 3,869,024 A | | 3/1975 | Hauth et al. |
| 3,966,028 A | | 6/1976 | Anderson et al. |
| 4,064,973 A | * | 12/1977 | Deem et al. ................ 188/71.7 |
| 4,194,596 A | * | 3/1980 | Garrett et al. .............. 188/72.7 |
| 4,235,312 A | * | 11/1980 | Garrett et al. .............. 188/72.7 |
| 4,301,897 A | | 11/1981 | Cox, Jr. |
| 4,369,863 A | * | 1/1983 | Farr et al. ................ 188/106 A |
| 4,553,646 A | | 11/1985 | Carré et al. |
| 4,623,047 A | | 11/1986 | Kleinhagen, Jr. |
| 4,784,244 A | | 11/1988 | Carré et al. |
| 4,793,447 A | * | 12/1988 | Taig et al. .................. 188/72.1 |
| 4,809,824 A | * | 3/1989 | Fargier et al. .............. 188/72.8 |
| 5,107,967 A | * | 4/1992 | Fujita et al. ................ 188/72.1 |
| 5,137,126 A | * | 8/1992 | Magnaval et al. .......... 188/343 |
| 5,348,123 A | * | 9/1994 | Takahashi et al. ......... 188/72.1 |
| 2004/0026185 A1 | | 2/2004 | Murayama et al. |
| 2004/0026187 A1 | * | 2/2004 | Murayama ................ 188/72.7 |
| 2004/0026190 A1 | | 2/2004 | Murayama et al. |

FOREIGN PATENT DOCUMENTS

| | | |
|---|---|---|
| DE | 1 475 399 | 9/1972 |
| DE | 2 334 091 | 1/1974 |
| DE | 32 13 355 A1 | 11/1982 |
| DE | 33 25 085 A | 1/1985 |
| GB | 1092686 | 11/1967 |
| GB | 1 458 362 | 12/1976 |
| GB | 2 143 292 A | 2/1985 |
| JP | 62-127533 | 6/1987 |

* cited by examiner

*Primary Examiner*—Chris Schwartz
(74) *Attorney, Agent, or Firm*—Burns, Doane, Swecker & Mathis LLP

(57) ABSTRACT

A wedge-operated brake apparatus includes a piston for generating a braking force when axially driven, an actuator for generating a linear brake-actuating input, and a wedge transmission mechanism for converting the linear brake-actuating input into a brake-actuating output in the axial direction of the piston. The brake-actuating output is transmitted to the piston so as to drive the piston to thereby generate a braking force. The wedge transmission mechanism includes a first plate member which moves together with the piston, a second plate member disposed in opposition to the first plate member and fixedly secured to a housing, a wedge member disposed between the first and second plate members and engaging respective engaging surfaces of the first and second plate members via rollers, and a holder for rotatably holding the rollers and holding the wedge member while allowing linear movement of the wedge member. When the wedge member moves linearly, the holder moves, while being guided by the first and second plate members.

1 Claim, 3 Drawing Sheets

WEDGE-OPERATED BRAKE APPARATUS

BACKGROUND OF THE INVENTION

1. Field of the Invention

The present invention relates to a wedge-operated brake apparatus, and more particularly, to a wedge-operated brake apparatus in which a linear brake-actuating input generated upon operation of an actuator is converted, by means of a wedge transmission mechanism, to a brake-actuating output in an axial direction of a piston, whereby the piston is driven in the axial direction so as to generate a braking force.

2. Description of the Related Art

A brake apparatus of such a type is disclosed in, for example, U.S. Pat. No. 4,235,312. In the brake apparatus, a wedge transmission mechanism includes an outboard member which moves together with a piston, an inboard member disposed in opposition to the outboard member and fixed to a housing, a wedge member disposed between these members and engaging respective engaging surfaces of the members via rollers, and a cage which rotatably holds the rollers. Further, the brake apparatus is configured in such a manner that a brake-actuating input acts on the wedge member as a pushing force.

Since the above-described conventional brake apparatus does not include mean for determining the positional relation between the wedge member and the engaging surfaces of the outboard member and the inboard member, the positions of the engaging surfaces of the outboard member and the inboard relative to the wedge member may deviate from their proper positions. In such a case an intended wedge effect cannot be attained, and a desired brake output efficiency cannot be obtained.

Further, the brake apparatus is configured in such a manner that a brake-actuating input acts on the wedge member as a pushing force, and does not include mean for determining the direction of movement of the wedge member relative to the engaging surfaces of the outboard member and the inboard member. Therefore, in the case in which the acting direction of the brake-actuating input and the moving direction of the wedge member do not coincide and are not located on the same line, a large load-transmission loss is generated when the brake-actuating input is transmitted to the wedge member from a load transmission member for transmitting the brake-actuating input to the wedge member, whereby load transmission efficiency may greatly decrease, and thus brake output efficiency may decrease.

SUMMARY OF THE INVENTION

The present invention was made in order to cope with the above-described problems, and an object of the present invention is to provide a wedge-operated brake apparatus which enables stable obtainment of an intended wedge effect to thereby stabilize brake output efficiency.

The present invention provides a wedge-operated brake apparatus comprising a piston accommodated within a cylinder portion to be slidable along an axial direction of the piston, the piston generating a braking force when axially driven; an actuator for generating a linear brake-actuating input; and a wedge transmission mechanism which is connected to the actuator so as to be driven thereby and to convert the linear brake-actuating input into a brake-actuating output in the axial direction of the piston, the brake-actuating output being transmitted to the piston so as to drive the piston. The wedge transmission mechanism includes a first plate member which moves together with the piston, a second plate member disposed in opposition to the first plate member and fixedly secured to a housing, a wedge member disposed between the first and second plate members and engaging respective engaging surfaces of the first and second plate members, via rollers, and a holder for rotatably holding the rollers and holding the wedge member while allowing linear movement of the wedge member, the holder being able to move, while being guided by the first and second plate members, when the wedge member moves linearly.

In the wedge-operated brake apparatus according to the present invention, a linear brake-actuating input generated upon operation of the actuator is converted, by means of the wedge transmission mechanism, into a brake-actuating output in the axial direction of the piston, whereby the piston is axially moved by the brake-actuating output so as to produce a braking force.

In the wedge-operated brake apparatus, by means of the holder, the rollers are rotatably held, and the wedge member is held to be linearly movable; and when the wedge member moves linearly, the holder moves, while being guided by the first and second plate members.

Therefore, the positional relation among the individual members, such as the plate members, the rollers, and the wedge member, and the direction of movement of the wedge member relative to the plate members can be defined or determined by means of the holder. Since the plate members and the rollers are held at respective proper positions relative to the wedge member, an intended wedge effect can be attained stably, and brake output efficiency can be stabilized.

In the wedge-operated brake apparatus of the present invention, the linear brake-actuating input generated upon operation of the actuator preferably acts on the wedge member as a pulling force. In this case, even when the acting direction of the brake-actuating input and the moving direction of the wedge member do not coincide and are not located on the same line, transmission of load to the wedge member from a load transmission member, which transmits the brake-actuating input to the wedge member, can be attained in a stable manner. Therefore, as compared with the case where the brake-actuating input acts on the wedge member as a pushing force, loss involved in the transmission of load from the load transmission member to the wedge member can be reduced in order to improve load transmission efficiency, whereby brake output efficiency can be improved and stabilized.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF PREFERRED EMBODIMENT

Figure 1:
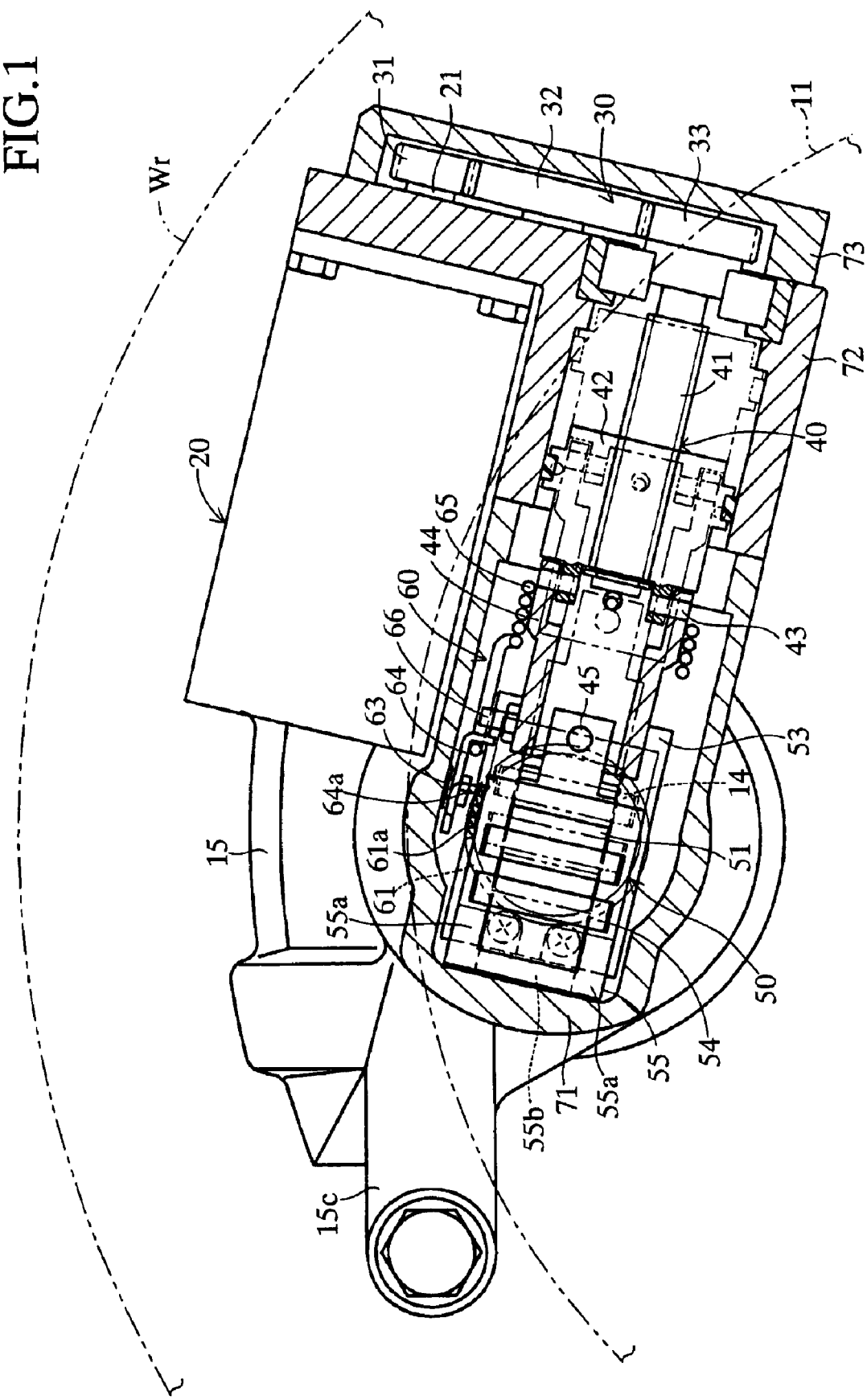
FIG. 1 is a cross-sectional side elevation of a wedge-operated brake apparatus according to an embodiment of the present invention.

Below, a preferred embodiment of the present invention will be described while referring to the accompanying drawings. FIGS. 1 to 4 show an embodiment of the present invention being employed as a disc brake apparatus for a vehicle. The disc brake apparatus of the present embodiment includes an inner brake pad 12 and an outer brake pad 13 which can grasp between them a brake rotor 11 which is integral with a wheel (in FIG. 1, the location of the inner diameter of the wheel rim is shown by the imaginary line Wr), and a piston 14 and a caliper 15 which can move the brake pads 12 and 13 in the axial direction of the rotor 11 towards the braking surfaces of the brake rotor 11.

The illustrated disc brake apparatus includes an electric motor 20, a gear train 30, a screw feed mechanism 40, and a wedge transmission mechanism 50 for applying a pressing force in the axial direction of the rotor 11 to the piston 14 and the caliper 15. The disc brake apparatus also includes an automatic gap adjusting mechanism 60 for automatically adjusting a gap between the brake pads 12 and 13 and the brake rotor 11 during a non-braking state.

Figure 2:
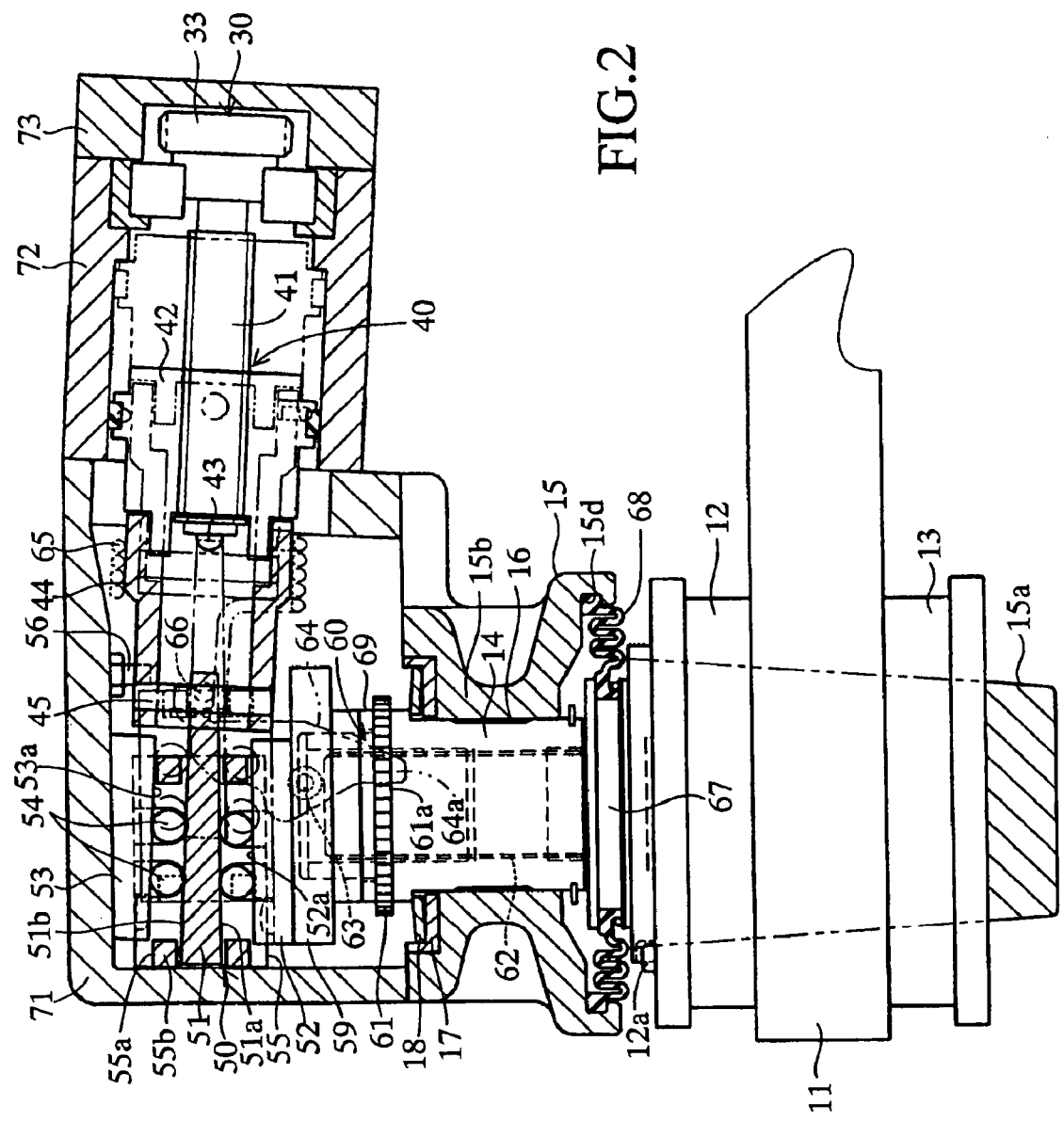
FIG. 2 is a cross-sectional view showing the relation among the gear train, the screw feed mechanism, the wedge transmission mechanism, the automatic gap adjusting mechanism, the brake pads, and the brake rotor shown in FIG. 1.

As shown in FIG. 2, the inner brake pad 12 can be moved towards and pressed against the brake rotor 11 by the piston 14. The outer brake pad 13 can be moved towards and pressed against the brake rotor 11 by a reaction arm 15a of the caliper 15. Both brake pads 12 and 13 are mounted on a mounting (a support bracket which is omitted from the drawings and which is mounted on the vehicle body) so as to be able to move in the axial direction of the rotor 11. The braking torque at the time of braking is sustained by the mounting.

The piston 14 is mounted on a cylinder portion 15b of the caliper 15 so as to be rotatable and slidable in the axial direction of the cylinder portion 15b via a cylindrical bearing 16, which is made of a solid lubricant or a similar member and permits smooth axial movement and smooth rotation of the piston 14. The piston 14 is biased in the axial direction of the piston away from the brake rotor 11 by means of a Belleville washer 18 which is disposed together with a support plate 17 between the caliper 15 and the piston 14. An adjusting wheel 61, which is an element of the automatic gap adjusting mechanism 60, is integrally provided on the outer circumference of the piston 14, and an adjusting nut 62, which is another element of the automatic gap adjusting mechanism 60, is integrally provided on the inner circumference of the piston 14.

The caliper 15 includes the above-mentioned reaction arm 15a and cylinder portion 15b, and also includes a pair of connecting arms 15c (one of the arms is shown in FIG. 1). The caliper 15 is attached to the mounting through the connecting arm 15c in a manner well known in the art so as to be able to move in the axial direction of the rotor 11. A first housing 71 which primarily houses the wedge transmission mechanism 50, a second housing 72 which primarily houses the screw feed mechanism 40, and a third housing 73 which primarily houses the gear train 30 are integrally attached to the caliper 15.

The electric motor 20 has a rotating output shaft 21 which is rotationally driven in a forward direction in response to an operation of a brake pedal (not illustrated) and which is rotationally driven in the reverse direction in response to release of the brake pedal. The output shaft 21 is mounted on the second housing 72 in such a manner that the output shaft 21 and a screw shaft 41 of the screw feed mechanism 40 are disposed side by side (the output shaft 21 is disposed in approximately parallel to the screw shaft 41 of the screw feed mechanism 40).

The gear train 30 transmits the rotational drive force of the output shaft 21 of the electric motor 20 as a rotational drive force at a reduced speed to the screw shaft 41, which is an input member of the screw feed mechanism 40. The gear train 30 is disposed between the electric motor 20 and the screw feed mechanism 40. The gear train 30 includes an input gear 31 which is secured to the output shaft 21 of the electric motor 20, an intermediate gear 32 which is rotatably supported by the second housing 72 and which always meshes with the input gear 31, and an output gear 33 which is integrally formed on an end of the screw shaft 41 of the screw feed mechanism 40 and which always meshes with the intermediate gear 32. The input gear 31 has a smaller diameter than the output gear 33 and thus can produce a reduction in speed.

The screw feed mechanism 40 converts the rotational drive force of the electric motor 20 into a drive force in the axial direction of the screw shaft 41 and transmits it to the wedge transmission mechanism 50. The screw feed mechanism 40 includes the screw shaft 41 which is rotatably mounted on the second housing 72, a ball nut 42 which has a female-thread portion in engagement with a male-thread portion of the screw shaft 41 and which is disposed in the second housing 72 so as to be able to move in the axial direction of the screw shaft 41 while being prevented from rotating, a connecting sleeve 44 which is integrally connected to the ball nut 42 through a connecting pin 43, and a connecting pin 45 which connects the connecting sleeve 44 and a wedge member 51 of the wedge transmission mechanism 50.

The wedge transmission mechanism 50 converts the drive force in the axial direction of the screw shaft 41 (linear brake-actuating input) which is transmitted from the screw feed mechanism 40 into a drive force (brake-actuating output) in a direction transverse to the direction of the drive force from the screw feed mechanism 40; i.e., in the axial direction of the piston 14, and transmits it to the piston 14. The wedge transmission mechanism 50 includes an outboard plate (first plate member) 52 which is mounted on an end of the piston 14 via a thrust bearing 69 and a base 59, an inboard plate (second plate member) 53 which opposes the outboard plate 52 and is secured to the first housing 71 by use of screws, and the wedge member 51, which is disposed between the plates 52 and 53 and which engages with rollers 54 disposed between the wedge member 51, and the plates 52 and 53.

Figure 3:
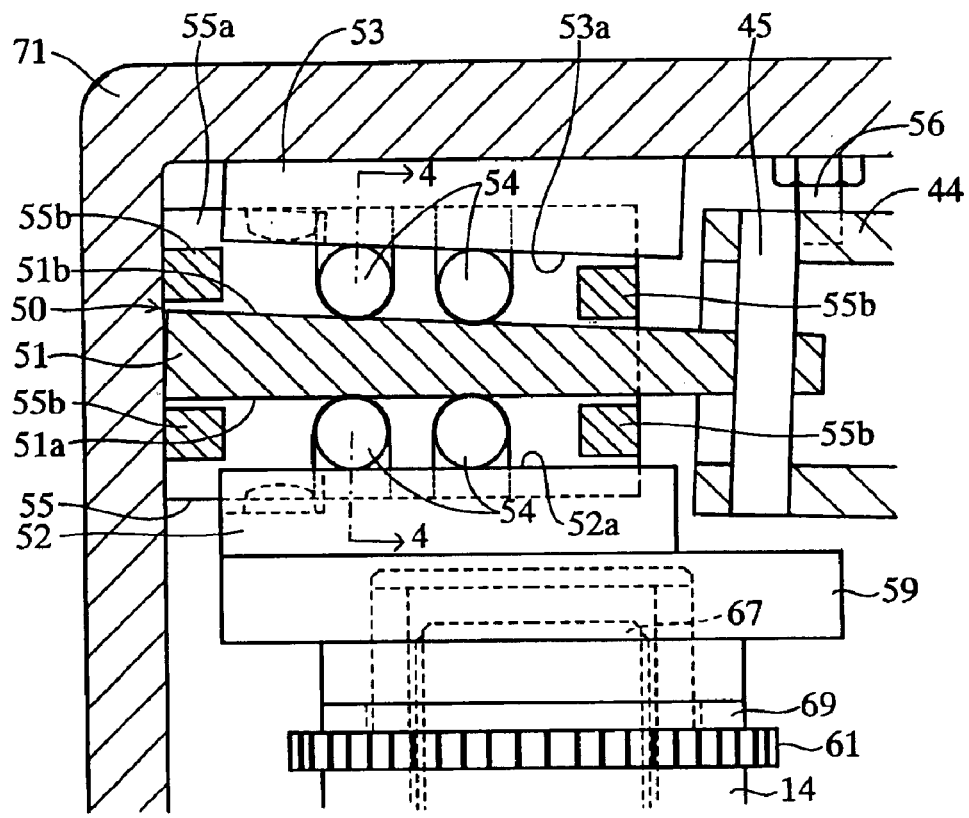
FIG. 3 is an enlarged cross section of the wedge transmission mechanism shown in FIG. 2.

As shown in FIGS. 2 and 3, the wedge member 51 has wedge surfaces 51a and 51b on its outboard and inboard sides, respectively. Two of the rollers 54 are in rolling contact with each of the wedge surfaces 51a and 51b. The wedge surface 51b on the inboard side; i.e., the side facing away from the piston 14 and facing towards the inboard plate 53, is a sloping wedge surface. The outboard plate 52 is secured to the base 59 by use of screws. The outboard plate 52 can move, together with the piston 14, in the axial direction of the piston 14 and can rotate, together with the base 59, about the axis of the piston 14 with respect thereto. The inboard side of the outboard plate 52 (the side facing away from the piston 14) has a flat engaging surface 52a which is parallel to the wedge surface 51a on the outboard side of the wedge member 51. The rollers 54 disposed between the wedge member 51 and the outboard plate 52 are in rolling contact with the opposing parallel surfaces 51a and 52a of the wedge member 51 and the outboard plate 52.

The outboard side (the side facing the piston 14) of the inboard plate 53 has a sloping engaging surface 53a which is parallel to the surface 51b of the inboard side (the side facing away from the piston 14) of the wedge member 51. This sloping engaging surface 53a of the inboard plate 53 is in rolling contact with the rollers 54 disposed between it and the wedge member 51. The sloping engaging surface 53a of the inboard plate 53 is roughly parallel to the axial direction of the screw shaft 41 of the screw feed mechanism 40. The direction of movement of the wedge member 51 roughly coincides with the direction of movement of the ball nut 42 and the connecting sleeve 44 of the screw feed mechanism 40 (the axial direction of the screw shaft 41).

Figure 4:
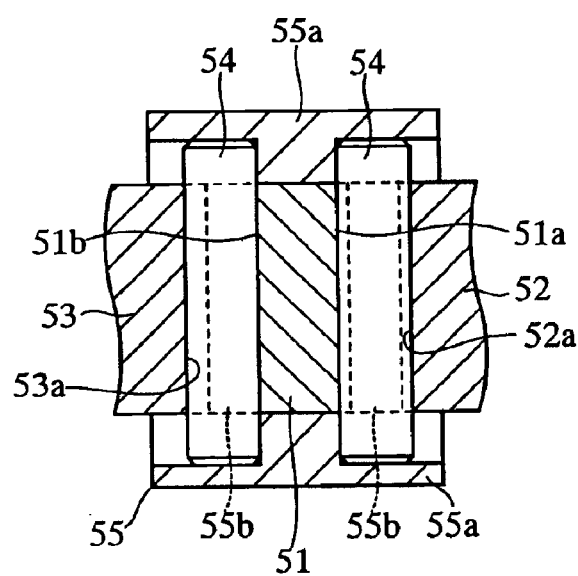
FIG. 4 is a cross-sectional view taken along line 4—4 of FIG. 3.

The wedge transmission mechanism 50 includes a holder 55 which rotatably holds the rollers 54 and also holds the wedge member 51 so as to allow straight or linear movement in the axial direction of the screw shaft 41. When the wedge member 51 moves linearly, the holder 55 moves in the axial direction of the screw shaft 41, while being guided by the plates 52 and 53. As shown in FIG. 4, the holder 55 includes a pair of plates 55a which constrain the wedge member 51 and the plates 52 and 53 in a direction roughly perpendicular to the axial direction of the screw shaft 41 (the axial direction of the rollers 54), and four connecting pillars 55b which integrally connect the pair of plates 55a. The amount of movement of the holder 55 in the axial direction of the screw shaft 41 is limited by the first housing 71 and by a stopper bolt 56 secured thereto.

The automatic gap adjusting mechanism 60 includes the above-described adjusting wheel 61 and adjusting nut 62 which are integrally formed on the piston 14. The automatic gap adjusting mechanism 60 also includes an adjusting lever 64 which is rotatably mounted on the first housing 71 via a support pin 63 and which has a pawl 64a formed on an end thereof (output-side end) and engaged with a ratchet tooth 61a of the adjusting wheel 61. A tension coil spring 65 is disposed so as to engage with the base end (input-side end) of the adjusting lever 64 and engage with the connecting sleeve 44. The spring 65 biases the adjusting lever 64 in the clockwise direction in FIG. 2. Moreover, the automatic gap adjusting mechanism 60 includes a pressing pin 66 mounted on the connecting sleeve 44, and an adjusting bolt 67 with which the adjusting nut 62 threadingly engages so that the nut 62 can rotate. The pressing pin 66 presses the adjusting lever 64 towards the position shown by solid lines when the connecting sleeve 44 returns to the position shown by solid lines in FIG. 1 and FIG. 2. The adjusting bolt 67 engages with a projection 12a on a backing plate of the inner brake pad 12 so as to be prevented from rotating.

A sealing boot 68 is mounted on the outer periphery of the projecting portion of the adjusting bolt 67. The outer periphery of the boot 68 fits inside and is secured to an annular groove 15d which is formed in the caliper 15. The thrust bearing 69, which is provided between the adjusting wheel 61 and the base 59 supporting the outboard plate 52 of the wedge transmission mechanism 50, enables smooth relative rotation between the base 59 and the adjusting wheel 61. The thrust bearing 69 is rotatably provided on the outer circumference of a cylindrical portion of the piston 14, which portion axially projects by a predetermined amount from an end portion of the piston 14 where the adjusting wheel 61 is provided. The base 59 has an inner hole which is open toward the piston 14, and is attached to the projecting cylindrical portion of the piston 14 in such a manner that the cylindrical portion is rotatably received in the inner hole of the base 59.

In this automatic gap adjusting mechanism 60, when, during braking, the connecting sleeve 44 moves from the position shown by solid lines in FIG. 1 and FIG. 2 to the position shown by imaginary lines, the adjusting lever 64, which is in a retracted position, is rotated in the clockwise direction in FIG. 2 through the coil spring 65 by a portion of the drive force in the axial direction of the screw shaft 41 (brake-actuating input). When the brake pedal is released, the adjusting lever 64 is pressed by the pressing pin 66 and is rotated in the counterclockwise direction in FIG. 2 and returns to its retracted position.

When the adjusting lever 64 is rotated in the clockwise direction in FIG. 2 during brake operation, the pawl 64a of the adjusting lever 64 engages with a ratchet tooth 61a of the adjusting wheel 61 and rotates the adjusting wheel 61. When the adjusting lever 64 is rotated in the counterclockwise direction in FIG. 2 to its retracted position when the brake pedal is released, the pawl 64a of the adjusting lever 64 separates from the ratchet tooth 61a of the adjusting wheel 61, and the adjusting wheel 61 is not rotated.

Therefore, in this automatic gap adjusting mechanism 60, when brake operation takes place, the adjusting wheel 61 is rotated by the adjusting lever 64 and the piston 14 rotates together with the adjusting wheel 61 as a single body. Because of the rotation of the piston 14, the adjusting bolt 67 which is threadingly engaged with the adjusting nut 62 is made to project towards the brake rotor 11, and the gap between the brake pads 12 and 13 and the brake rotor 11 in a non-actuated state is automatically adjusted.

When the amount of return movement of the pawl 64a of the adjusting lever 64 is at least an amount corresponding to the pitch of the ratchet teeth 61a formed on the adjusting wheel 61, the pawl 64a of the adjusting lever 64 engages with the next ratchet tooth 61a when the adjusting lever 64 returns to its retracted position. Therefore, at the time of the next brake operation, the pawl 64a of the adjusting lever 64 engages with the next ratchet tooth 61a and rotates the adjusting wheel 61, so that the above-described gap is adjusted.

In the disc brake apparatus of the embodiment having the above-described structure, when the output shaft 21 of the electric motor 20 is rotatably driven by operation by the brake pedal (not shown), the rotational drive force of the electric motor 20 is transmitted to the screw shaft 41 of the screw feed mechanism 40 through the gear train 30, and the rotational drive force is converted into a drive force in the axial direction of the screw shaft 41 by the screw feed mechanism 40.

The drive force which is converted into the axial direction of the screw shaft 41 in the screw feed mechanism 40 is transmitted to the wedge member 51 from the ball nut 42 through the connecting pin 43, the connecting sleeve 44, and the connecting pin 45. The drive force is converted into a drive force in the axial direction of the piston 14 by the wedge transmission mechanism 50, and the drive force is transmitted to the piston 14 from the outboard plate 52 through the base 59 and the thrust bearing 69.

Therefore, the piston 14 is driven in its axial direction, it pushes the inner brake pad 12 towards the brake rotor 11, and, by its reaction, the reaction arm 15a of the caliper 15 moves the outer brake pad 13 towards the brake rotor 11, and the brake rotor 11 is grasped between the inner brake pad 12 and the outer brake pad 13. As a result, a braking force is generated between the brake pads 12 and 13, and the brake rotor 11, and the brake rotor 11 is braked.

In the disc brake apparatus of the embodiment, by means of the holder 55 of the wedge transmission mechanism 50, the rollers 54 are rotatably held, and the wedge member 51 is held to be linearly movable; and during linear movement of the wedge member 51, the holder 55 moves along the axial direction of the screw shaft 41 while being guided by the outboard plate 52 and the inboard plate 53.

Therefore, the positional relation among the individual members, such as the plates 52 and 53, the rollers 54, and the wedge member 51, and the direction of movement of the wedge member 51 relative to the plates 52 and 53 can be defined or determined by means of the holder 55. Since the plates 52 and 53 and the rollers 54 are held at respective proper positions relative to the wedge member 51, an intended wedge effect can be attained stably, and brake output efficiency can be stabilized.

The disc brake apparatus of the embodiment is configured in such a manner that the drive force in the axial direction of the screw shaft 41 (linear brake-actuating input), which is generated through cooperative operations of the electric motor 20, the gear train 30, and the screw feed mechanism 40, acts on the wedge member 51 as a pulling force, which results in generation of a force that cancels out a moment force generated by the difference between the direction of the brake-actuating input and the moving direction of the wedge member. Therefore, even in the case in which the acting direction of the brake-actuating input and the moving direction of the wedge member 51 do not coincide and are not located on the same line, transmission of load from the connecting sleeve 44 (a load transmission member for transmitting the brake-actuating input to the wedge member 51) to the wedge member 51 is attained stably.

Therefore, as compared with the case where the brake-actuating input acts on the wedge member 51 as a pushing force, loss involved in the transmission of load from the connecting sleeve 44 to the wedge member 51 can be reduced in order to improve load transmission efficiency, whereby brake output efficiency can be improved and stabilized. Notably, when the brake-actuating input acts on the wedge member 51 as a pushing force; i.e., when a pushing force is imposed on the wedge member 51 as in the case of the prior art technique, a moment force is generated by the difference between the direction of the brake-actuating input and the moving direction of the wedge member, whereby load transmission loss is generated.

In the disc brake apparatus of the embodiment, the gear train 30 which transmits the rotational drive force of the electric motor 20 to the screw shaft 41 of the screw feed mechanism 40 as a rotational drive force is disposed between the electric motor 20 and the screw feed mechanism 40. Therefore, by suitably selecting the structure of the gear train 30, the layout of the electric motor 20 with respect to the screw feed mechanism 40 can be optimized. Accordingly, in this disc brake apparatus, the freedom of installation of the electric motor 20 with respect to the screw feed mechanism 40 can be increased. In addition, the axial dimension of the structure comprising the electric motor 20 and the screw feed mechanism 40 can be decreased. As a result, the mountability of the disc brake apparatus on a vehicle can be improved.

In the disc brake apparatus of the embodiment, the output shaft 21 of the electric motor 20 and the screw shaft 41 of the screw feed mechanism 40 are disposed side by side (the output shaft 21 of the electric motor 20 is disposed in approximately parallel to the screw shaft 41 of the screw feed mechanism 40). Therefore, the electric motor 20 can be compactly disposed in the shape of a C with respect to the screw feed mechanism 40, a decrease in size of the disc brake apparatus can be achieved, and the mountability of the apparatus can be further improved. The output gear 33 of the gear train 30 is integrally formed on the screw shaft 41 of the screw feed mechanism 40, so that the number of parts of the disc brake apparatus can be decreased, a decrease in the size and weight of the disc brake apparatus can be achieved, and costs can also be decreased.

In the above-describe embodiment, the linear brake-actuating input which acts on the wedge member 51 as a pulling force is generated by an actuator consisting of the electric motor 20, the gear train 30, the screw feed mechanism 40, etc. However, the present invention can be practiced while using, instead of the above-described actuator, an actuator which can directly generate a linear brake-actuating input which acts on the wedge member 51 as a pulling force (e.g., an air motor disclosed in U.S. Pat. No. 4,235,312).

Moreover, in the above-described embodiment, the present invention was applied to a movable caliper-type disc brake apparatus, but the present invention can of course be applied to other types of disc brake apparatuses. Moreover, the present invention can be applied to a drum brake apparatus in the same manner as in the above-described embodiment or with suitable modifications.

What is claimed is:

1. A wedge-operated brake apparatus comprising:

a piston accommodated within a cylinder portion to be slidable along an axial direction of the piston, the piston generating a braking force when axially driven;

an actuator for generating a linear brake-actuating input; and a wedge transmission mechanism which is connected to the actuator so as to be driven thereby and to convert the linear brake-actuating input into a brake-actuating output in the axial direction of the piston, the brake-actuating output being transmitted to the piston so as to drive the piston, wherein the wedge transmission mechanism includes a first plate member which moves together with the piston, a second plate member disposed in opposition to the first plate member and fixedly secured to a housing, a wedge member disposed between the first and second plate members and engaging respective engaging surfaces of the first and second plate members via rollers, and a holder for rotatably holding the rollers and holding the wedge member while allowing linear movement of the wedge member, the holder being able to move, while being guided by the first and second plate members, when the wedge member moves linearly;

wherein the linear brake-actuating input generated upon operation of the actuator acts on the wedge member as a pulling force, wherein the holder comprises:

a pair of plates which constrains the wedge member, the first plate member and the second plate member in the axial direction of the roller, and plural connecting pillars which integrally connect the pair of plates.

* * * * *